United States Patent [19]

Schwenninger et al.

[11] Patent Number: 4,704,153
[45] Date of Patent: Nov. 3, 1987

[54] VACUUM REFINING OF GLASSY MATERIALS WITH CONTROLLED FOAMING

[75] Inventors: Ronald L. Schwenninger, Ridgeley, W. Va.; Joseph M. Matesa, Plum Boro, Pa.

[73] Assignee: PPG Industries, Inc., Pittsburgh, Pa.

[21] Appl. No.: 895,647

[22] Filed: Aug. 12, 1986

[51] Int. Cl.$^4$ ............................................. C03B 5/225
[52] U.S. Cl. ........................................ 65/134; 65/129; 65/135; 65/136
[58] Field of Search ................. 65/129, 134, 135, 136, 65/335, 347

[56] References Cited

U.S. PATENT DOCUMENTS

| | | |
|---|---|---|
| 805,139 | 11/1905 | Hitchcock . |
| 1,564,235 | 12/1925 | Harrington . |
| 1,598,308 | 8/1926 | Pike . |
| 2,465,283 | 3/1949 | Schlehr . |
| 2,781,411 | 2/1957 | Geffcken et al. . |
| 2,877,280 | 3/1959 | Eden . |
| 3,338,694 | 8/1967 | Davy ........................................ 65/32 |
| 3,350,185 | 10/1967 | Rough ...................................... 65/32 |
| 3,429,684 | 2/1969 | Plumat ................................... 65/335 |
| 3,442,622 | 5/1969 | Monnier et al. .................... 23/233.5 |
| 3,499,743 | 3/1970 | Fanica et al. ..................... 65/135 X |
| 3,519,412 | 7/1970 | Olink ..................................... 65/337 |
| 4,083,711 | 4/1978 | Jensen .................................... 65/346 |
| 4,110,097 | 8/1978 | Chevallier et al. .................. 65/136 |
| 4,110,098 | 8/1978 | Mattmuller ........................... 65/141 |
| 4,195,982 | 4/1980 | Coucoulas et al. .................. 65/134 |
| 4,492,594 | 1/1985 | Curley ............................. 65/136 X |
| 4,545,798 | 10/1985 | Matesa .................................... 65/27 |

FOREIGN PATENT DOCUMENTS 334720 9/1930 United Kingdom ................. 65/136
278052 12/1970 U.S.S.R. .

Primary Examiner—Arthur Kellogg
Attorney, Agent, or Firm—Dennis G. Millman

[57] ABSTRACT

In the process for refining glass or the like by vacuum, the collapse of foam is expedited by heating the headspace within the vacuum chamber.

24 Claims, 2 Drawing Figures

VACUUM REFINING OF GLASSY MATERIALS WITH CONTROLLED FOAMING

BACKGROUND OF THE INVENTION

The present invention relates to the use of subatmospheric pressure to expedite refining of molten glass or the like. More particularly, the invention relates to a practical arrangement for controlling the amount of foaming in such a refining technique.

In the melting of glass, substantial quantities of gas are produced as a result of decomposition of batch materials. Other gases are physically entrained by the batch materials or are introduced into the melting glass from combustion heat sources. Most of the gas escapes during the initial phase of melting, but some becomes entrapped in the melt. Some of the trapped gas dissolves in the glass, but other portions form discrete gaseous inclusions known as bubbles or "seeds" which would be objectionable if permitted to remain in unduly high concentrations in the product glass. The gas inclusions will rise to the surface and escape from the melt if given sufficient time in the stage of a melting operation known as "refining" or "fining." High temperatures are conventionally provided in the refining zone to expedite the rise and escape of the gaseous inclusions by reducing the viscosity of the melt and by enlarging the bubble diameters. The energy required for the high temperatures employed in the refining stage and the large melting vessel required to provide sufficient residence time for the gaseous inclusions to escape from the melt are major expenses of a glassmaking operation. Accordingly, it would be desirable to assist the refining process to reduce these costs.

It has been known that reduced pressure could assist the refining process by reducing the partial pressure of the included gaseous species and by increasing the volume of bubbles within the melt so as to speed their rise to the surface. The impracticality of providing a gastight vessel on the scale of a conventional refining chamber so as to draw a vacuum therein has limited the use of vacuum refining to relatively small scale batch operations such as disclosed in U.S. Pat. Nos. 1,564,235; 2,781,411; 2,877,280; 3,338,694; and 3,442,622.

Continuous vacuum refining processes have been proposed but have not found acceptance for large scale, continuous manufacture of glass due to various drawbacks. In the continuous vacuum refining arrangements shown in U.S. Pat. Nos. 805,139; 1,598,308; and 3,519,412 a major disadvantage is the requirement for relatively narrow vertical passageways leading into and out of the vacuum zone necessitated by the pressure difference. These passageways complicate the construction of such a vessel, particularly in view of the requirement for gas-tight walls, increase the exposure of the throughput to contaminating refractory contact, and impose a significant viscous drag to the throughput flow. It may be noted that a substantial height of glass is required to balance even a moderate degree of vacuum. Varying the output of such a system is also a problem, particularly in view of the viscous drag factor. Variability is important in a continuous commercial operation due to changes in the product being made and economic factors that affect the rate of production desired. In each of the three patents noted above, the driving force for increasing the rate of flow through the passages of the vacuum section can be provided only by increasing the depth of the melt upstream of the vacuum section relative to the depth of the melt downstream from the vacuum section. The magnitude of this level difference is exacerbated by the viscous drag inherent in these systems. Because accelerated erosion of the side walls occurs at the elevation of the surface of the melt, significantly changing the level aggravates the erosion which, in turn, deteriorates the quality of the product glass.

A simpler structure is shown in U.S. Pat. No. 3,429,684, wherein batch materials are fed through a vacuum lock and melted at the top of a vertically elongated vacuum chamber. Varying throughput in that arrangement appears to require changing the amount of vacuum imposed in the chamber, which would disadvantageously alter the degree of refining achieved. Melting raw materials within the vacuum chamber is another disadvantage of that arrangement for three reasons. First, large volumes of foam would be created by carrying out the initial decomposition of the raw materials under vacuum, which would require a vessel large enough to contain the foam. Second, there is a danger that raw materials may follow a short circulation path to the output stream, thus avoiding adequate melting and refining. Third, carrying out the initial stages of melting and heating the melt to a refining temperature within the vacuum vessel require large amounts of heat to be supplied to the melt within the vessel. Such a major heat input to the vessel inherently induces convection currents within the melt that increase erosion of the walls, which leads to contamination of the refined product stream.

U.S. Pat. No. 4,195,982 discloses initially melting glass under elevated pressure and then refining the glass in a separate chamber at a lower pressure. Both chambers are heated.

U.S. Pat. No. 4,110,098 discloses a process of deliberately foaming glass to aid refining. The foaming is induced by intense heat and chemical foaming agents at atmospheric pressure.

A problem encountered with vacuum refining on any scale, whether continuous or batchwise, is the copious volume of foam that is sometimes produced, particularly at lower pressures. A large space above the liquid container must be provided to accommodate the foam. Since this head space must also be maintained gas-tight, its construction can be a significant economic drawback, particularly on a large scale process. As a result, the foam acts as a limiting factor to the degree of vacuum that can be utilized. It would be desirable to alleviate this constraint on vacuum refining processes without incurring major capital expenditures.

U.S. Pat. No. 3,350,185 discloses a technique for collapsing foam in a glass melting process at atmospheric pressure, wherein an abrupt change in oxidizing or reducing condition of the combustion was found to cause foam to collapse.

SUMMARY OF THE INVENTION

The present invention relates to an improvement in the technique for vacuum refining glass or the like disclosed in U.S. patent application Ser. No. 815,494 filed Jan. 2, 1986. That technique involves passing molten material into an upper portion of a vertically elongated chamber under vacuum. One advantageous aspect is that by imparting all or most of the thermal energy required for refining upstream from the vacuum chamber, little or no heating need by carried out in the vacuum chamber, the heat content of the incoming material being itself substantially sufficient to maintain the desired temperatures in the vacuum chamber. But it has been found to be advantageous to provide auxiliary heating in the headspace at the top of the vacuum chamber for the sake of expediting the collapse of foam. It is believed that the foam layer that gathers at the top of the chamber tends to insulate the headspace from the heat of the underlying molten mass. Also, the short residence time in the headspace of the entering stream of material appears to provide little heating of the headspace. Therefore, it is believed that the headspace tends to be relatively cool, and as a result, portions of the foam layer also tend to be relatively cool, whereby the viscosity of those foam portions is greater and the collapse of those portions is retarded. It is theorized that the accelerated collapse of foam caused by heating the headspace is due to raising the temperature and thus lowering the viscosity of the foam. When a combustion heat source is employed to heat the headspace, there may also be a mechanical enhancement of the rate of foam collapse due to impingement of combustion gases onto the bubble membranes of the foam.

A part of the present invention is the discovery that a combustion heat source can be operated in the reduced atmosphere of the vacuum refining chamber at a rate sufficient to accomplish the objectives of the present invention without significantly affecting the ability to maintain the desired subatmospheric pressures in the chamber. Also, it has been found that the flame is readily sustainable in the reduced pressure environment.

In one mode of operation, additional advantages are attained by employing a heat source that does not produce a combustion product that is the same as a gas being removed from the melt by the refining process. In other words, it is advantageous to maintain as low as possible the partial pressure in the headspace of any species being refined out of the melt. For glass, removal of nitrogen and carbon dioxide is usually a primary objective of the refining process. Therefore, it is advantageous to employ oxygen enriched combustion (preferably essentially pure oxygen) for firing a burner to heat the headspace of the vacuum chamber so as to reduce or eliminate introduction of nitrogen into the chamber. Additionally, by using oxygen as a partial or total replacement for air to support combustion, the exhaust gas volume is significantly reduced, thereby reducing the load on the vacuum system. To avoid adding carbon oxides to the headspace atmosphere, the burner may use fuel having a low carbon content or no carbon (e.g., hydrogen). The combustion of hydrogen with oxygen is particularly advantageous because the sole product of combustion is water vapor. Because of the relatively high solubility of water vapor in glass, removal of water is usually not a requirement for a glass refining process. Also, the ability to condense the water vapor in the vacuum system virtually eliminates any additional burden on the vacuum pump caused by the headspace burner. Another alternative is the use of a plasma torch to heat the headspace. A plasma torch can produce a large thermal output with a relatively small volume of carrier gas. Also, the carrier gas can be selected from a wide variety of gases including steam, hydrogen, oxygen, or inert gases such as helium.

THE DRAWINGS

DETAILED DESCRIPTION

Figure 1:
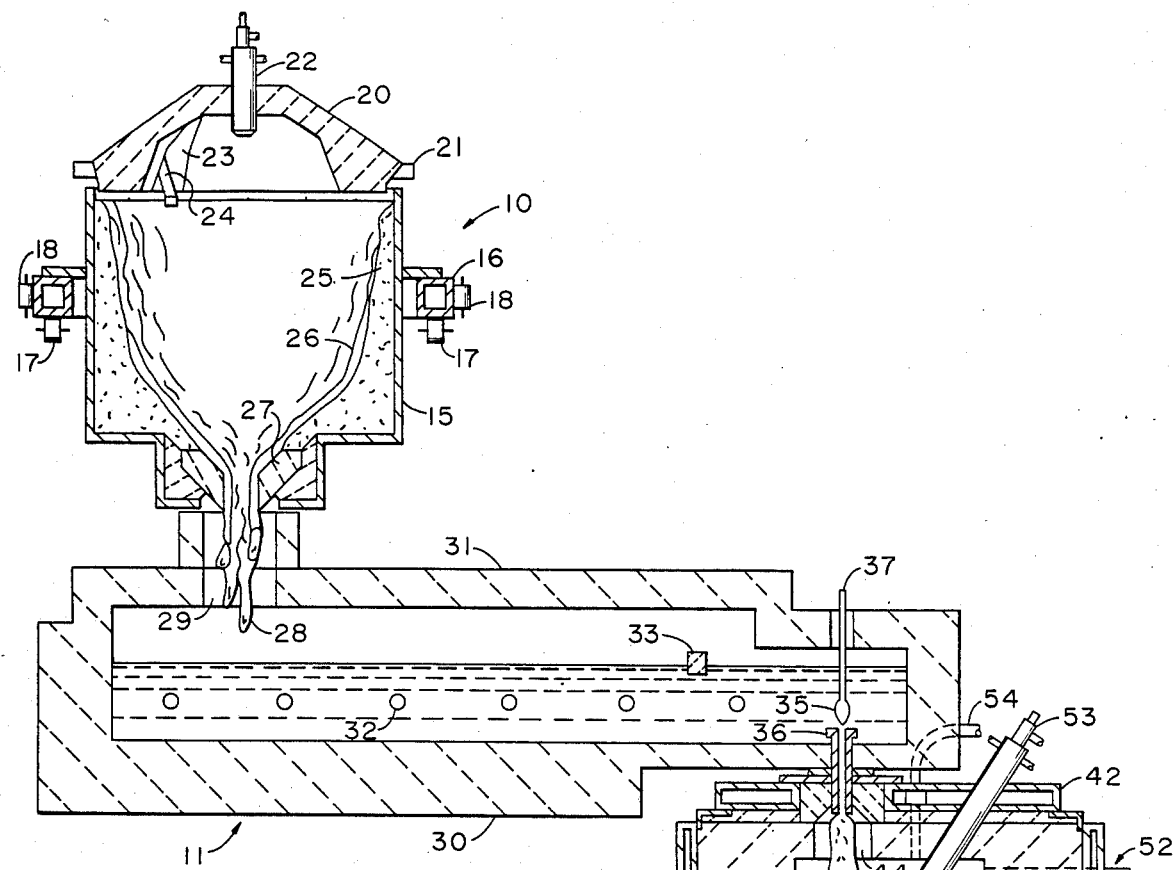
FIG. 1 is a vertical cross-section through three stages of a melting operation including a liquefaction stage, dissolving stage and a vacuum refining stage in accordance with a preferred embodiment of the present invention.

The detailed description will be set forth in conjunction with a method and apparatus specifically adapted for melting glass and similar glassy materials, but it should be understood that the invention is applicable to the processing of other materials as well.

Although not limited thereto, the present invention is advantageously used in conjunction with a vacuum refining system disclosed in the aforesaid U.S. patent application Ser. No. 815,494 filed on Jan. 2, 1986. In the preferred embodiments of that system, molten material is admitted to a space under subatmospheric pressure to create a foam which is subsequently collapsed. The greatly increased surface area of the foam expedites removal of gases from the material while under reduced pressure. Upon return to atmospheric pressure the concentration of gases dissolved in the melt is below saturation, so that nucleation into bubbles or seeds is unlikely. Because of the active foaming involved in that method accelerating the collapse of foam is advantageous for increasing throughput.

In preferred embodiments, batch materials are first liquefied at a stage specifically adapted for that step of the process, and the liquefied material is transferred to a second stage where dissolution of solid particles is essentially completed and the temperature of the material may be raised to a temperature suitable for refining. Subsequently, the molten material is passed to the vacuum chamber. As a result, a large portion of the gaseous by-products of melting is driven off before the material is subjected to vacuum, and the region of greatest gas evolution is separated from the refining zone, whereby materials undergoing the early stages of melting cannot become mixed with portions of the melt undergoing refining. Because most or all of the thermal requirement for melting has been satisfied before the material enters the vacuum refining stage, and because heating of the refining stage can therefore be substantially avoided, excessive convection of the melt in the refining zone can be avoided. As a result, vessel erosion is reduced and the probability of incompletely refined portions of the melt becoming mixed with more refined portions is reduced. The input to the refining stage in the preferred embodiment is at a temperature suitable for refining, and therefore little or no heat need be provided to the refining vassel. However, the vacuum chamber headspace heating means in the present invention may serve to compensate for heat losses through the walls of the vessel, particularly the upper portion, to substantially maintain the temperature of the material in at least the entrance portion of the refining stage.

In a preferred vacuum refining arrangement, liquefied material is metered into the upper end of the vacuum chamber through valve means, and refined melt is passed from the lower end of the vacuum chamber through another valve arrangement. The height of liquid maintained within the vacuum chamber is preferably at least slightly greater than the height required to counterbalance the vacuum. Thus, the throughput rate can be controlled by means of the valves without altering the vacuum pressure in the chamber and without changing the liquid level within the chamber. Conversely, a range of vacuum pressures can be employed without changing the throughput rate. Aside from the valves, the system is provided with relatively low resistance to flow of the molten material therethrough.

The preferred configuration for the vacuum refining chamber is a vertically elongated vessel, most conveniently in the shape of an upright cylinder. Liquefied material is introduced into the headspace above the molten material held in the vessel. Upon encountering the reduced pressure in the headspace, at least a substantial portion of the material foams due to evolvement of gases dissolved in the material and due to enlargement of bubbles and seeds present in the material. Creating a foam greatly increases the surface area exposed to the reduced pressure, thus aiding the removal of gaseous species from the liquid phase. Producing the foam above the molten pool held in the vessel rather than from the molten pool is advantageous for collapsing foam and aiding the escape of gases. It has also been found that depositing newly generated foam onto a foam layer expedites collapse of the foam. Another advantage of the vertically elongated geometry is that by generating foam at the top and draining product from the bottom, the overall mass transport is away from the foam region, thereby rendering it unlikely that any of the foam would become included in the product stream. Stripping gases from the melt at reduced pressure reduces the concentration of gases dissolved in the melt to below their saturation points at atmospheric pressure. As the molten material progresses downwardly toward an outlet at the bottom, the increasing pressure due to the depth of the melt in the vessel induces residual gases to remain in solution and decreases the volume of any small seeds that may remain. Dissolution of gases may also be aided by permitting the temperature to fall as the material progresses toward the outlet.

In conventional melting of glass, sodium sulfate or calcium sulfate or other sources of sulfur are included in the batch materials to aid the melting and refining process. The presence of sulfur compounds in the melt has been found to be a problem when refining with vacuum because of the large volumes of foam induced and because of attack on the ceramic refractory walls of a vacuum refining vessel. But heretofore, effective melting and refining of glass have been difficult to achieve without the sulfur compounds. It is yet another advantageous aspect of the preferred vacuum fining arrangement that glass can be melted and refined to a high standard of quality with the use of little or no sulfur. This is feasible in the present invention because the melting and refining steps are carried out in discrete stages, whereby each stage may be carried out by a process adapted to minimize or avoid the use of sulfur.

Referring to the FIG. 1, the overall melting process of the present invention preferably consists of three stages: a liquefaction stage 10, a dissolving stage 11 and a vacuum refining stage 12. Various arrangements could be employed to initiate the melting in the liquefaction stage 10, but a highly effective arrangement for isolating this stage of the process and carrying it out economically is that disclosed in U.S. Pat. No. 4,381,934, the disclosure of which is hereby incorporated by reference for details of the preferred liquefaction stage embodiment. The basic structure of the liquefaction vessel is a drum 15 which may be fabricated of steel and has a generally cylindrical sidewall portion, a generally open top, and a bottom portion that is closed except for a drain outlet. The drum 15 is mounted for rotation about a substantially vertical axis, for example, by means of an encircling support ring 16 rotatably carried on a plurality of support wheels 17 and held in place by a plurality of aligning wheels 18. A substantially enclosed cavity is formed within the drum 15 by means of a lid structure 20 which is provided with stationary support by way of a peripheral frame 21, for example. The lid 20 may be constructed of refractory ceramic material and may take a variety of forms as may be known to those of skill in the refractory furnace construction art. The arrangement depicted in the figure is an upwardly domed, sprung arch construction fabricated from a plurality of refractory blocks. It should be understood that monolithic or flat suspended designs could be employed for the lid.

Heat for liquefying the batch material may be provided by one or more burners 22 extending through the lid 20. Preferably, a plurality of burners are arranged around the perimeter of the lid so as to direct their flames toward a wide area of the material within the drum. The burners are preferably water cooled to protect them from the harsh environment within the vessel. Exhaust gases may escape from the interior of the liquefaction vessel through an opening 23 in the lid. Advantageously the waste heat in the exhaust gases may be used to preheat the batch material in a preheating stage (not shown) such as that disclosed in U.S. Pat. No. 4,519,814.

Batch materials, preferably in a pulverulent state, may be fed into the cavity of the liquefying vessel by means of a chute 24, which in the embodiment depicted extends through the exhaust opening 23. Details of the feed chute arrangement may be seen in U.S. Pat. No. 4,529,428. The batch chute 24 terminates closely adjacent to the sidewalls of the drum 10, whereby batch material is deposited onto the inner sidewall portions of the drum. A layer 25 of the batch material is retained on the interior walls of the drum 10 aided by the rotation of the drum and serves as an insulating lining. As batch material on the surface of the lining 25 is exposed to the heat within the cavity, it forms a liquefied layer 26 that flows down the sloped lining to a central drain opening at the bottom of the vessel. The outlet may be fitted with a ceramic refractory bushing 27. A stream of liquefied material 28 falls freely from the liquefaction vessel through an opening 29 leading to the second stage 11.

The second stage may be termed the dissolving vessel because one of its functions is to complete the dissolution of any unmelted grains of batch material remaining in the liquefied stream 28 leaving the liquefaction vessel 10. The liquefied material at that point is typically only partially melted including unmelted sand grains and a substantial gaseous phase. In a typical soda-lime-silica melting process using carbonate batch materials and sulfates as refining aids, the gaseous phase is chiefly comprised of carbon oxides and sulfur oxides. Nitrogen may also be present from entrapped air.

The dissolving vessel 11 serves the function of completing the dissolution of unmelted particles in the liquefied material coming from the first stage by providing residence time at a location isolated from the downstream refining stage. Soda-lime-silica glass batch typically liquefies at a temperature of about 2100° F. (1150° C.) to 2200° F. (1200° C.) and enters the dissolving vessel 11 at a temperature of about 2100° F. (1200° C.) to about 2400° F. (1320° C.), at which temperature residual unmelted particles usually become dissolved when provided with sufficient residence time. The dissolving vessel 11 shown is in the form of a horizontally elongated refractory basin 30 with a refractory roof 31 with the inlet and outlet at opposite ends thereof so as to assure adequate residence time. The depth of molten material in the dissolving vessel may be relatively shallow in order to discourage recirculation of material.

Although the addition of substantial thermal energy is not necessary to perform the dissolving step, heating can expedite the process and thus reduce the size of the dissolving vessel 11. More significantly, however, it is preferred to heat the material in the dissolving stage so as to raise its temperature in preparation for the refining stage to follow. Maximizing the temperature for refining is advantageous for the sake of reducing glass viscosity and increasing vapor pressure of included gases. Typically a temperature of about 2800° F. (1520° C.) is considered desirable for refining soda-lime-silica glass, but when vacuum is employed to assist refining, lower peak refining temperatures may be used without sacrificing product quality. The amount by which temperatures can be reduced depends upon the degree of vacuum. Therefore, when refining is to be performed under vacuum in accordance with the present invention, the glass temperature need be raised to no more than 2700° F. (1480° C.), for example, preferably no more than 2600° F. (1430° C.) and optimally no more than 2500° F. (1370° C.) prior to refining. Peak temperature reductions on this order result in significantly longer life for refractory vessels as well as energy savings. The liquefied material entering the dissolving vessel need be heated only moderately to prepare the molten material for refining. Combustion heat sources could be used in the dissolving stage 11, but it has been found that this stage lends itself well to electric heating, whereby a plurality of electrodes 32 may be provided as shown in the figure extending horizontally through the sidewalls. Heat is generated by the resistance of the melt itself to electric current passing between electrodes in the technique conventionally employed to electrically melt glass. The electrodes 32 may be carbon or molybdenum of a type well known to those of skill in the art. A skimming member 33 may be provided in the dissolving vessel to prevent any floating material from approaching the outlet end.

A valve controlling the flow of material from the dissolving stage 11 to the refining stage 12 is comprised of a plunger 35 axially aligned with a drain tube 36. The shaft 37 of the plunger extends through the roof 31 of the dissolving vessel so as to permit control over the gap of the plunger 35 and the tube 36 to thereby modulate the rate of flow of material into the refining stage. The valve tube 36 may be fabricated of a refractory metal such as platinum and is sealingly fitted into an orifice 44 at the upper end of the refining vessel. Although the valve arrangement is preferred, other means could be provided to control the flow rate of molten material to the refining stage as are known in the art. An example would be the use of heating and/or cooling means associated with the drain tube so as to modulate the viscosity, and thus the flow rate, of the molten material passing therethrough.

The refining stage 12 preferably consists of a vertically upright vessel that may be generally cylindrical in configuration, having an interior ceramic refractory lining 40 shrouded in a gas-tight, water-cooled casing. The refractory may be an alumina-zirconia-silica type well known in the art. The casing may include a double walled, cylindrical sidewall jacket 41 having an annular water passageway and circular end coolers 42 and 43. Any suitable cooling arrangement may be employed. A layer of insulation (not shown) may be provided between the lining 40 and the jacket 41.

As the molten material passes through the tube 36 and encounters the reduced pressure within the refining vessel, gases included in the melt expand in volume, creating a foam layer 50 resting on a body of liquid 51. As foam collapses it is incorporated into the liquid body 51. Subatmospheric pressure may be established within the refining vessel through a vacuum conduit 52 extending through the upper portion of the vessel.

A conduit 54 may extend into the upper portion of the refining for the purpose of introducing foam breaking agents into the vessel in the event that additional foam breaking is needed. A preferred foam breaking agent is water which may be sprayed onto the foam either continuously or intermittently.

Refined molten material is drained from the bottom of the refining vessel 12 by way of a drain tube 55 of a refractory metal such as platinum. The drain tube 55 preferably extends above the surface of the refractory bottom section 56 within which it is mounted to prevent any debris from entering the output stream. The bottom section 56 may be provided with reduced thickness adjacent to the tube 55 so as to reduce the insulating effect on the tube, thereby permitting the temperature of the tube to be elevated to prevent freezing of material within the tube. Leakage around the tube is prevented by a water cooler 57 under the bottom section 56. The flow rate of molten material from the drain tube 55 is controlled by a conical throttle member 58 carried at the end of a stem 59. The stem 59 is associated with mechanical means (not shown) to adjust the elevation of the throttle member 58 and thus adjust the gap between the throttle member and the tube 55 so as to control the flow rate therefrom. A molten stream 60 of refined material falls freely from the bottom of the refining vessel and may be passed to a forming station (not shown) where it may be shaped to the desired product. Refined glass, for example, may be passed to a float glass forming chamber where the molten glass floats on a pool of molten metal to form a flat sheet of glass.

Although various shapes could be employed, the refining vessel 12 is preferably cylindrical in configuration. The cylindrical shape is advantageous for the sake of constructing a gas-tight vessel. The ratio of interior surface contact area to volume is also minimized with a circular cross-section. Compared to a conventional open hearth type recirculating refiner, only a fraction of the refractory contact area is entailed by the cylindrical vacuum refiner of the present invention.

The height of molten material 51 retained in the refiner 12 is dictated by the level of vacuum imposed in the chamber. The pressure head due to the height of the liquid must be sufficient to establish a pressure equal to or greater than atmospheric at the outlet to permit the material to drain freely from the vessel. The height will depend upon the specific gravity of the molten material, which for soda-lime-silica glass at the temperatures involved is about 2.3. A height in excess of the minimum required to offset the vacuum may be desired to account for fluctuations in atmospheric pressure, to permit variation of the vacuum, and to assure steady flow through the outlet. In the preferred embodiments of the present invention, a substantial excess height is provided so that the outlet flow rate is not determined by the vacuum pressure, but rather by mechanical valve means. Such an arrangement permits the throughput rate and the vacuum pressure to be varied independently of each other. Alternatively, the pressure at the outlet could be below atmospheric if the outlet is provided with pump means to overcome the pressure differential. An example of a pump that is intended for use with molten glass is disclosed in U.S. Pat. No. 4,083,711, this disclosure of which is hereby incorporated by reference.

The benefits of vacuum on the refining process are attained by degrees; the lower the pressure, the greater the benefit. Small reductions in pressure below atmospheric may yield measurable improvements, but to economically justify the vacuum chamber the use of substantially reduced pressures are preferred. Thus, a pressure of no more than one-half atmosphere is preferred for the appreciable refining improvements imparted to soda-lime-silica flat glass. Even better results are obtained at one-third atmosphere or less. A standard clear soda-lime-silica flat glass composition was refined at an absolute pressure of 100 torr and yielded a product having one seed per 100 cubic centimeters, which is a quality level acceptable for many glass products. A refining pressure below 100 torr, for example, 20 to 50 torr would be preferred in order to yield commercial float glass quality of about one seed per 1,000–10,000 cubic centimeters. Seeds less than 0.01 millimeter in diamter are considered imperceptible and are not included in the seed counts.

The headspace heating means of the present invention may take the form of a burner 53 extending through the top cooler 42 into the refining vessel 12 as shown in FIG. 1. The burner is preferably provided with a water cooled jacket to extend its life. Although the precise mechanism for foam breaking is not fully understood, it is theorized that heat from the burner reduces the viscosity of the foam and increases the volume of the bubbles, both of which tend to cause the bubbles of the foam to burst. When operated with sufficiently high flame velocity, impact of the flame on the foam may cause foam bubbles to burst. When the drain tube 36 is fabricated of platinum, an oxidizing flame is preferably employed to avoid deteriorating the platinum. If platinum is not present in the head space of the vacuum vessel, a reducing flame is preferred for its greater tendency to collapse foam.

To avoid introducing nitrogen into the system from combustion air, it is preferred that the burner 53 be fired with oxygen. Nitrogen that might become entrained into the glass has a relatively high defect potential in glass because of its relatively low solubility in molten glass. If it is desired to avoid carbon dioxide, another source of bubbles in glass, hydrogen may be used as the fuel. Water, the product of combustion of hydrogen with oxygen, has a relatively high degree of solubility in molten glass. It is also desirable to avoid carbon dioxide because lowering the concentration of carbon dioxide in the melt is one of the usual objectives of the refining step, and therefore it is desirable to maintain the partial pressure of carbon dioxide in the headspace in the refining vessel as low as possible. Removal of water from the melt, on the other hand, is usually not a concern. Likewise, a plasma torch could be used in place of the burner 53, with carrier gas that is relatively soluble in glass, such as steam or helium. Oxygen and/or hydrogen could also be used as plasma carrier gases. Plasma torches are known in the art, an example of which is shown in U.S. Pat. No. 4,545,798, the disclosure of which is hereby incorporated by reference.

Figure 2:
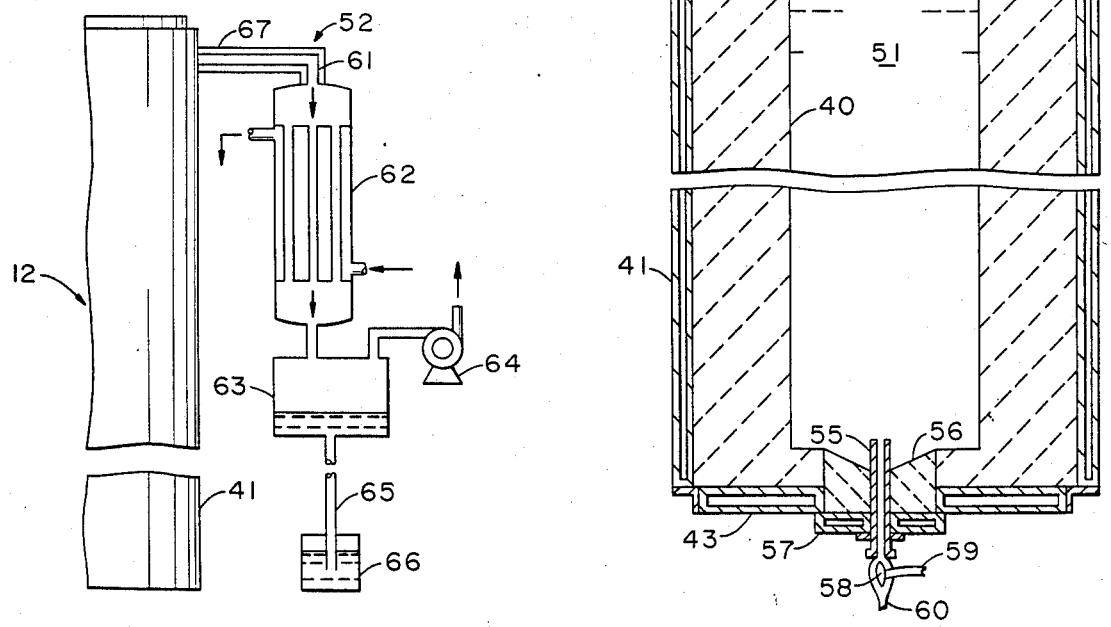
FIG. 2 is a schematic representation on a reduced scale of a vacuum system with vapor condensation means.

Condensable products of combustion from the burner 53 may be removed from the gas withdrawn from the vacuum chamber through conduit 52 so as to reduce the gas volume that must be handled by the vacuum pump, which in turn makes it easier to attain lower pressures. When a substantial portion of the exhaust consists of water vapor, such as when the burner 53 uses hydrogen and oxygen, condensation of the water vapor is particularly useful since the gas volume remaining after condensation can be very small. A conventional condensate trap arrangement may be employed, an example of which is shown schematically in FIG. 2. There, the exhaust conduit 52 is provided with a water jacket 67 to protect a gas conduit 61 from the hot gases passing therethrough. A conventional shell and tube heat exchanger 62 may be employed to cool the exhaust gases. In the arrangement depicted, cooling water is passed through the shell to cool the gases passing through the tubes. The gases are cooled to the dew point of water at the pressure present in the vacuum system so as to condense water vapor from the gases. Condensed water and any residual gas flows to a water trap chamber 63 from which the gases pass to a vacuum pump 64 and the water drains to a pressure equalization column 65 which extends vertically to a collection vessel 66 or drain. If deposition of solids occurs to a significant extent on the heat exchanger surfaces, it may be advantageous to pass the gas upwardly through the heat exchanger so that condensed water flowing downwardly will flush deposits from the entrance end of the heat exchanger.

Melting and fining aids such as sulfur or fluorine compounds are conventionally included in glass batches but produce a substantial portion of the undesirable emissions in exhaust gas from glass melting furnaces. Their elimination would be desirable, but to attain the highest levels of quality, particularly for flat glass standards, use of the aids has been considered necessary. Furthermore, sulfur sources (e.g., sodium sulfate, calcium sulfate) have been found to cause excessive foaming under vacuum. Typically, flat glass batch includes sodium sulfate in the amounts of about 5 to 15 parts by weight per 1000 parts by weight of the silica source material (sand), with about 10 parts by weight considered desirable to assure adequate refining. When operating in accordance with the present invention, however, it has been found preferable to restrict the sodium sulfate to two parts by weight to maintain a manageable level of foaming, and yet it has been found that refining is not detrimentally affected. Most preferably, the sodium sulfate is utilized at no more than one part per 1000 parts sand, with one-half part being a particularly advantageous example. These weight ratios have been given for sodium sulfate, but it should be apparent that they can be normalized to other sulfur sources by molecular weight ratios. Omitting any deliberate addition of sulfur source material is also feasible, although trace amounts of sulfur compounds often present in typical mineral source batch materials usually cause some sulfur to be introduced into the melt.

Other variations as would be known to those of skill in the art may be resorted to within the scope of the present invention as defined by the claims that follow.

We claim:

1. A method of refining glassy material or the like wherein a volume of the material in a molten state is retained in an enclosed vessel under subatmospheric pressure to assist refining of the material, additional molten material is introduced in a molten state into the vessel in a manner to substantially foam the material upon entry into the vessel to produce a foam layer on the retained volume of molten material, and the region above the foam layer within the vessel is supplementally heated so as to accelerate collapse of the foam while maintaining the substmospheric pressure.

2. The method of claim 1 wherein the heating is carried out by combustion within the vessel.

3. The method of claim 2 wherein the combustion includes a flame that is directed toward the foam.

4. The method of claim 2 wherein the combustion is sustained by an oxidant gas whose oxygen content is enriched above the oxygen content of air.

5. The method of claim 4 wherein the oxidant gas consists essentially of oxygen.

6. The method of claim 2 wherein the combustion is of an at least partially carbon-free fuel.

7. The method of claim 6 wherein the fuel consists essentially of hydrogen.

8. The method of claim 4 wherein the combustion is of an at least partially carbon-free fuel.

9. The method of claim 5 wherein the combustion is of a fuel consisting essentially of hydrogen.

10. The method of claim 1 wherein the heating is carried out by a plasma torch.

11. The method of claim 10 wherein the plasma employs a carrier gas selected from the group consisting of steam, hydrogen, oxygen, helium, and mixtures thereof.

12. The method of claim 1 wherein the subatmospheric pressure in the headspace above the foam layer is no more than one half of atmospheric pressure.

13. The method of claim 1 wherein the exterior of the vessel is cooled.

14. The method of claim 1 wherein additional molten material enters the vessel above the level of the retained volume of molten material in the vessel.

15. The method of claim 14 wherein the additional molten material foams as it enters the vessel.

16. The method of claim 2 wherein the products of the combustion are substantially free of carbon oxides.

17. The method of claim 16 wherein the products of the combustion are substantially free of nitrogen.

18. The method of claim 2 wherein the products of the combustion are substantially free of nitrogen.

19. The method of claim 2 wherein the products of combustion include water, and the water is withdrawn from the vessel and condensed while under subatmospheric pressure.

20. The method of claim 1 wherein the material is soda-lime-silica glass.

21. The method of claim 20 wherein the material is flat glass.

22. The method of claim 20 wherein the material initially includes a sulfur compound as a refining aid in an amount no greater than an equivalent amount of 2 parts by weight of sodium sulfate per 1000 parts by weight of silica source material.

23. The method of claim 22 wherein the material is provided with no deliberate inclusion of a sulfur-containing refining aid.

24. The method of claim 14 wherein the material follows a predominantly vertical path in the vessel and is removed from the vessel at an outlet at the bottom portion of the vessel.

* * * * *